Feb. 9, 1954 — W. H. SEYFFERT, JR — 2,668,554
DIFFERENTIAL FLOW VALVE FOR WELLS
Filed Feb. 11, 1949 — 2 Sheets-Sheet 1

WALTER H. SEYFFERT JR.
*INVENTOR.*

BY Lester B. Clark
Ray L. Smith
ATTORNEYS

Feb. 9, 1954 W. H. SEYFFERT, JR 2,668,554
DIFFERENTIAL FLOW VALVE FOR WELLS
Filed Feb. 11, 1949 2 Sheets-Sheet 2
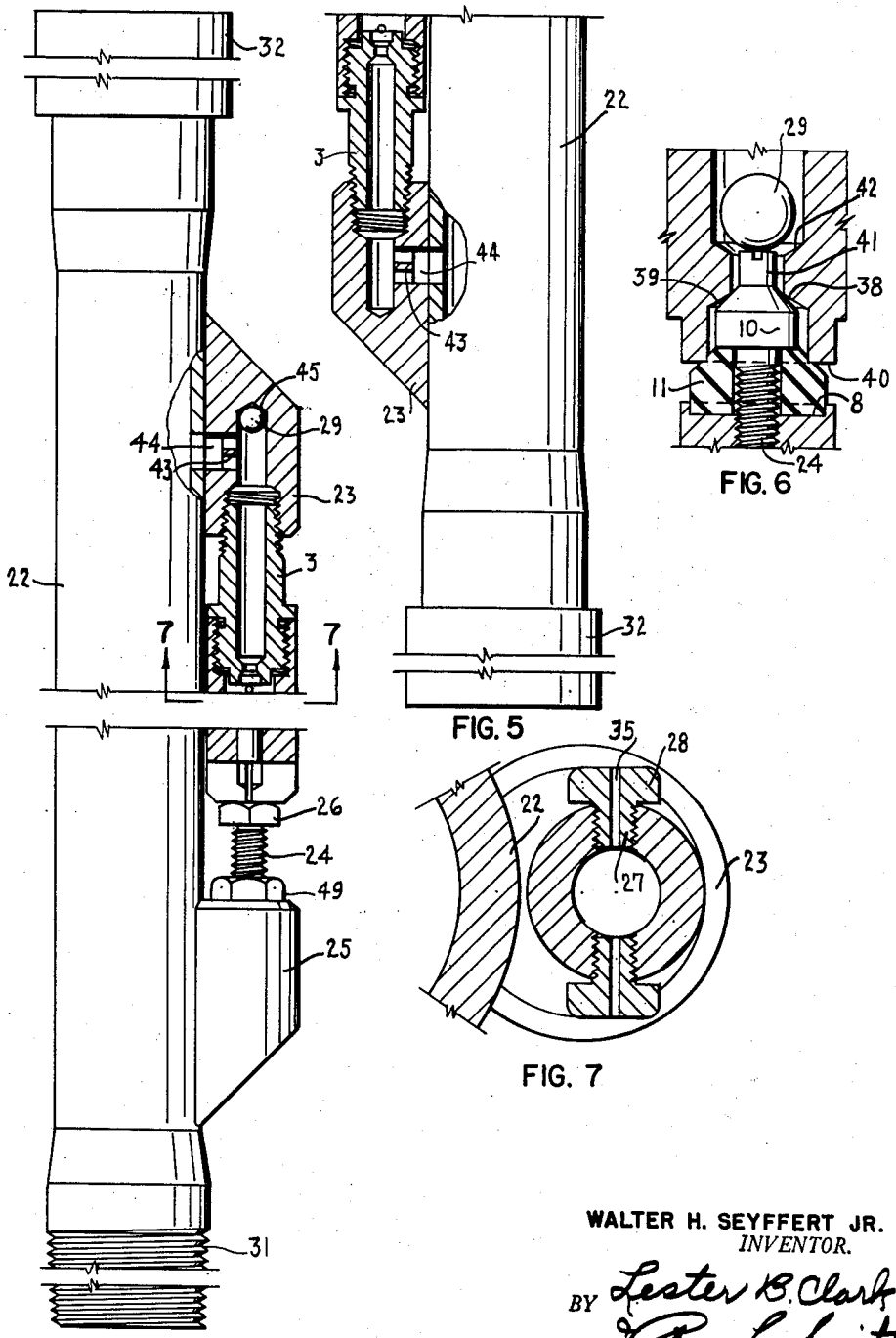
WALTER H. SEYFFERT JR.
INVENTOR.
BY Lester B. Clark
Ray L. Smith
ATTORNEYS Patented Feb. 9, 1954

2,668,554

UNITED STATES PATENT OFFICE 2,668,554

DIFFERENTIAL FLOW VALVE FOR WELLS

Walter H. Seyffert, Jr., Houston, Tex., assignor to Camco, Incorporated

Application February 11, 1949, Serial No. 75,863

2 Claims. (Cl. 137—155)

The invention relates to an improvement in differential flow valves, and to well flowing therewith.

It is an object of this invention to provide a differential flow valve in which turbulence is reduced by providing a valve seat face which is tangent to the inrushing cylinder of gas or fluid.

It is also an object of this invention to provide a valve of this class in which the seating unit comprises a metallic element and also an element of organic material or plastic, whereby both a metal to metal and a metal to organic material seat may be obtained.

It is a further object of this invention to provide a valve of this class in which the valve element of organic material is highly wear resistant; does not swell to any objectionable extent under pressure; and forms a perfect seal with metal.

It is still another object of this invention to provide a valve of this class which will provide a metal to metal seat in case of leakage through the metal to organic material seat.

It is yet a further object of this invention to provide a valve of this class in which the orifices are removable to insure that orifice size may be readily changed, and are of substantial length and are consequently more durable and can also provide a more uniform flow therethrough.

Yet another object of this invention is the providing of a valve of this class which opens automatically responsive to the pressure differential between casing pressure and tubing pressure.

Another object of this invention is the providing of a valve of this class which has as its one working part the stem assembly.

Still another object of this invention is the provision of a valve of this class which has port means in the end of the stem thereof to dampen the closing of the valve.

It is still a further object of this invention to provide a valve of this class in which the differential may be readily adjusted.

Still a further object of this invention considers the provision of a valve of this class which is simple in design and construction; which is easily repaired; and which has a long life efficiency.

It is also an object of this invention to provide a valve and mandrel assembly in which the valve is mounted between lugs on the mandrel exterior, thereby permitting a full and uninterrupted opening through the interior of the mandrel and tubing assembly.

It is a further object of this invention to provide an assembly of this class in which the valve may be adjustably mounted between protective lugs and locked against being loosened by vibration.

It is yet a further object of this invention to provide an assembly of this class in which the valve orifices extend from the valve and act as stops against the valve being rotated loose from its mounting on the mandrel due to excessive vibration.

Another object of this invention is the providing of an assembly of this class which includes a check ball to prevent backflow of fluid from tubing to casing.

Other and further objects of this invention will be obvious when the specification is considered in connection with the drawings, in which:

Fig. 4 is a view, part in section, which shows the valve and mandrel; the unseated stem assembly not being shown.

Fig. 5 is a view, part in section, which shows another manner of assembling valve and mandrel;

Fig. 6 is an enlarged sectional view which shows the stem assembly seated in the valve and mandrel assembly of Fig. 4;

Fig. 7 is an enlarged fragmentary sectional plan view through the valve and part of the mandrel which shows assembled relationship of valve and mandrel.

Figure 1:
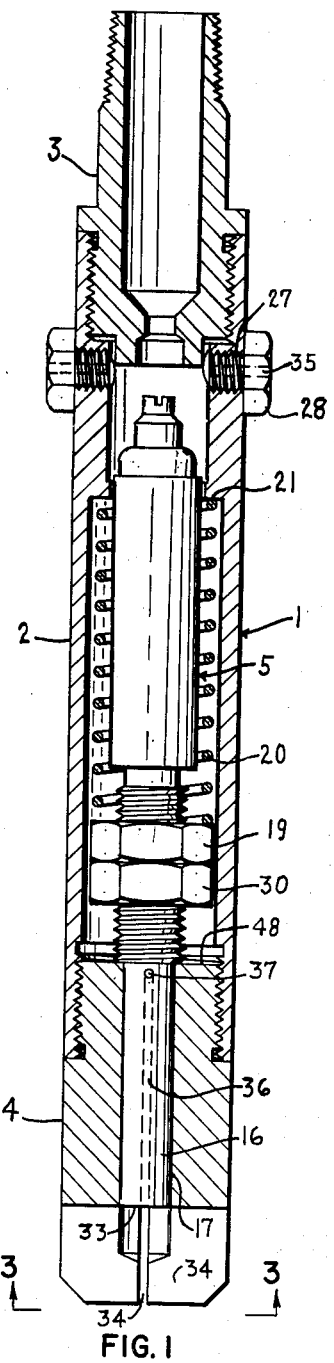
Fig. 1 is a sectional view of the valve.
Figure 2:
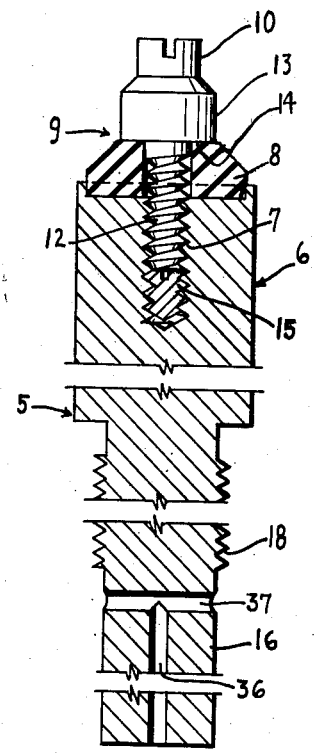
Fig. 2 is a sectional view of the stem assembly.
Figure 3:
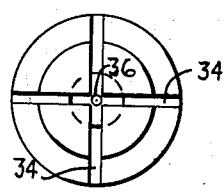
Fig. 3 is a plan view of the valve.

The valve assembly 1 includes a sleeve 2, which is internally threaded at one end to receive a seat element 3 and internally threaded at the other end to receive an end closure piece 4.

The stem assembly 5 includes the stem 6 which has a threaded bore 7 and a cup 8 at one end so that the seating unit 9 may be fitted thereto. This seating unit 9 includes a metallic seating element 10 which has a threaded end 12 which passes centrally through the organic material seating element 11 to be threaded into the bore 7 so that the body 13 of the seating element 10 may firmly confine the element 11 between the face 14 and the cup 8. For purposes of adjustment a set screw 15 is first threaded into the bore 7 to the desired depth and when the end 12 is threaded into the bore 7 to contact the head of this set screw 15, the seating unit 9 is firmly locked to the stem.

At the other end the stem 6 terminates in a shaft 16 which slides through the bore 17 of the closure piece 4, and between the shaft 16 and the stem body 17, the stem has a threaded section 18 which may shoulder against the closure piece top 48 without sealing therewith, and which has thereon the nut 19 which confines the spring 20 between the top surface of the nut and the internal shoulder 21 of the sleeve 2. The nut 30 on the threaded section 18 may then be tightened against the nut 19 to lock the nuts on the stem.

The valve assembly 1 is adapted for assembly with the mandrel 22, the seat element 3 being threadable into the protective lug 23 and the screw 24, which is threadable in the protective lug 25, being adjustable so that the head 26 thereof will bind against the closure piece 4 when the screw is locked in such position by the nut 49. The orifices 27, which are threaded into the sleeve 2 at diametrically opposite points thereon, offer additional security against the valve 1 being threaded by vibration into fuller engagement with protective lug 23 and therefore out of engagement with the screw head 26, since the valve can only rotate less than one fourth of a turn before the orifice head 28 of an orifice 27 will be brought into stopping engagement with the mandrel 22. This feature will also insure against the valve becoming unscrewed from the lug 23 in cases where the screw 24 may not be employed, or may become broken off in operation.

Prior to assembling valve and mandrel, the tension of the spring 20 is adjusted by means of nuts 19 and 30 until it exerts some pre-determined pressure, as 125 pounds per square inch. The valve, mandrel, and check ball 29, may then be assembled as shown in Fig. 4, and the mandrel assembled with the tubing string of a well, the male end 31 of the mandrel being lowermost and the female end 32 uppermost.

Fluid, as gas, in the casing or bore surrounding the tubing or pumping string, may exert pressure, or may be built up to exert a pressure, as by forcing gas from the top of the well into the bore or casing, and this pressure may be set at some pre-determined figure, as 500 pounds per square inch. Such pressure will operate on the end surface 33 of the stem shaft 16, the fluid having access to the stem shaft by way of the cross slits 34. This pressure will be sufficient to firmly close the valve, as shown in Fig. 6.

The back pressure created by the gas passing in through the orifice ports 35 and on up into the lower pressure area of the tubing or mandrel interior offers negligible resistance to the closing of the valve. The stem shaft 16 has the axially extending port 36 therein, which is crossed by the radially extending port 37, so that prior to the closing of the valve gas may pass into the valve interior through these ports to operate on the "dash pot" principle and dampen the closing of the valve, but the balance of areas is such as to positively insure that the valve will close.

As shown in Fig. 6, a double seat is obtained in the valve, the seating surface 38 of the metallic seating element 10 being chamfered at one angle, as 45°, while the corresponding surface 39 of the seat element 3 is chamfered at another angle, as 30° to the horizontal. On the other hand the face 40 of the seat element 3 is spaced from the surface 39 thereof so as to extend against the organic material sealing element 11 when the valve is closed. The head 41 of the seating element 10 then extends far enough above the chamfered surface 42 of the seat element 3 to keep the check ball 29 from being seated by fluid pressures from within the tubing string or mandrel.

Fluid, as oil within the tubing, builds up a pressure head as it rises therein until such pressure in this cited example exceeds 375 pounds per square inch. This pressure added to the 125 pounds per square inch spring pressure, exceeds the 500 pounds per square inch setting of the gas pressure in the casing or bore and acts thereagainst to unseat the valve.

Because of the excessive turbulence resulting from the inrushing of gas through the orifice ports 35 radially spaced about the sleeve 2 and shown diametrically opposed in Fig. 1, it has been found necessary to provide a seat element 3 having a face 40, which will extend in assembly so as to be tangent to the cylinders or jets of inrushing gas which will pass over such face and impinge upon each other. The gas will then flow upwardly through the seat element into the tubing string. As such gas is under greater pressure than the fluid column in the tubing string, the result of such differential in pressure will permit the gas to force the fluid upwardly in the tubing. After this occurs the pressure acting from the tubing to maintain the valve open will fall below the pre-determined opening figure, as 375 pounds per square inch, and permit the gas pressure in the casing or bore to close the valve again.

In order to keep the check ball 29 from being blown out into the mandrel or tubing by the gas when the valve opens the lug 23 has a bar 43 which extends across the port 44, and a recess 45 is also provided in the lug to receive the ball when in open position.

It is a feature of this invention to provide an organic material seating element 11 which will not swell in the presence of oil; which is especially wear resistant against the constant impingement of fluid or gas thereupon as such passes into the valve at high velocities through the orifice ports 35; and which is calculated to seal perfectly with metal. Materials such as rubber or synthetic rubber such as neoprene would not meet these requirements and it was necessary to develop Hycar, an organic material from the field of plastics, to meet such specifications.

In the absence of Hycar as the material of the seating element 11, or in case such element could be conceived of as deteriorating in service until the whole outer portion, defined by the annulus outward of the inner rim of the face 40, falls away, the valve would still provide a seal between the surfaces 38 and 39.

As the orifice port diameter 35 is a function of the valve operation it is a feature of this invention to provide removable orifices 28 so that orifices of varying port diameters may be installed.

Fig. 5 shows a modification of the assembly of valve and mandrel which may be employed in cases where a well has a tremendous volume of water in the tubing string and is not likely to build up any pressure of fluid, as oil, to open the valve until after the water has been removed. This assembly permits the valve to be installed in most favorable position to protect the interior parts thereof from sand and foreign substances which might otherwise enter from the tubing or mandrel. Such assembly omits the check valve since there is no danger of the valve opening until a tremendous head of water is built up above the valve location.

Broadly, this invention considers an improved differential valve which is not limited to the specific features of turbulence reduction, removable orifices, double seating valve, valve element composition, and assembly features of valve and mandrel herein specifically disclosed, but consideration is given to all structures capable of carrying out the objects of invention.

What is claimed is:

1. In a well flowing assembly the combination of, a valve comprising a successively interconnected bored seat element, sleeve, and bored closure piece, a stem having a seating unit at one end adapted to seat in said seat element and a shaft at the other end adapted to slide in said closure piece bore, adjustment means on said stem, stop means in said sleeve, resilient means adjustably confined between said stop means and adjustment means, orifice means through said sleeve wall, a mandrel, a plug thereon adapted to receive said seat element, and a passageway through said plug between the interior of said mandrel and said seat element bore and a check ball in said passageway, and a bar across said passageway to prevent the check ball from being blown into said mandrel.

2. In a well flowing assembly the combination of, a valve comprising a successively interconnected bored seat element, sleeve, and bored closure piece, a stem having a seating unit at one end adapted to seat in said seat element and a shaft at the other end adapted to slide in said closure piece bore, adjustment means on said stem, stop means in said sleeve, resilient means adjustably confined between said stop means and adjustment means, orifice means through said sleeve wall, a mandrel, a plug thereon adapted to receive said seat element, a passageway through said plug between the interior of said mandrel and said seat element bore, said orifice means comprising a pair of diametrically oppositely located removable orifices on said sleeve and extending therefrom, said valve being in such proximity to said mandrel that the extending orifices act as stops against the mandrel after less than one quarter turn of valve rotation.

WALTER H. SEYFFERT, JR.

References Cited in the file of this patent

UNITED STATES PATENTS

| Number | Name | Date |
|---|---|---|
| 818,054 | Sears | Apr. 17, 1906 |
| 855,350 | Singmaster | May 28, 1907 |
| 1,698,097 | Honywill, Jr. | Jan. 8, 1929 |
| 1,885,338 | Estep | Nov. 1, 1932 |
| 1,944,155 | Dippman | Jan. 23, 1934 |
| 2,002,672 | Melott | May 28, 1935 |
| 2,188,656 | Guiberson | Jan. 20, 1940 |
| 2,241,656 | Crickmer | May 13, 1941 |
| 2,265,835 | Godsey | Dec. 9, 1941 |
| 2,265,836 | Godsey | Dec. 9, 1941 |
| 2,292,768 | Parker | Aug. 11, 1942 |
| 2,312,315 | Boynton | Mar. 2, 1943 |
| 2,314,869 | Boynton | Mar. 30, 1943 |
| 2,321,003 | Boynton | June 18, 1943 |
| 2,413,869 | Hamer | Jan. 7, 1947 |
| 2,446,940 | Mahon | Aug. 10, 1948 |
| 2,465,060 | Carlisle | Mar. 22, 1949 |
| 2,588,715 | Garrett | Mar. 11, 1952 |